Nov. 26, 1963　　　A. H. LAMBACH　　　3,111,973
ARMORED VEHICLE TIRE
Filed March 5, 1962
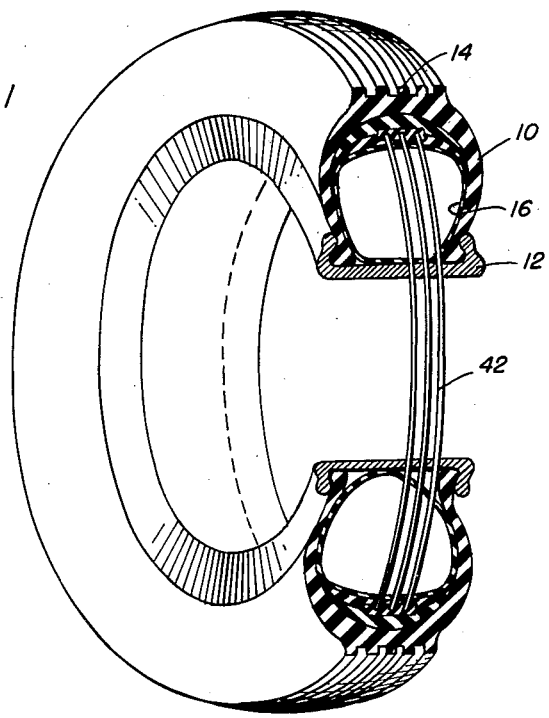
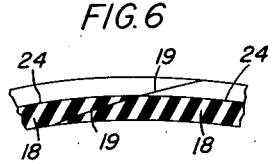
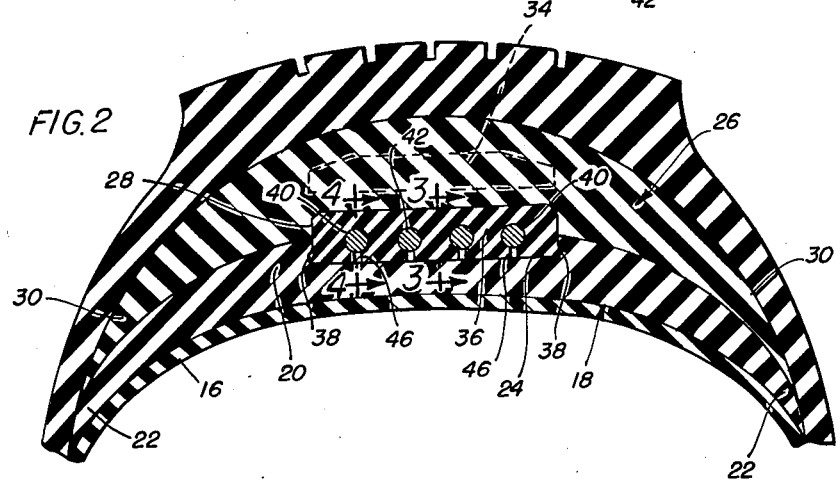
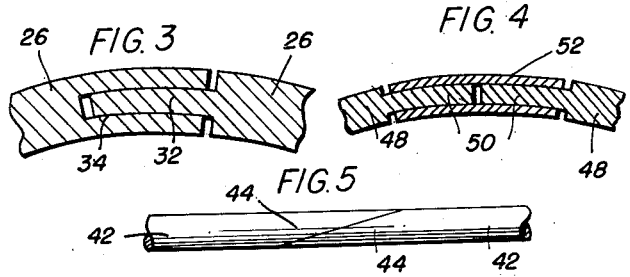
INVENTOR:
ADOLPH H. LAMBACH
BY
ATT'Y

United States Patent Office 3,111,973
Patented Nov. 26, 1963

3,111,973
ARMORED VEHICLE TIRE
Adolph H. Lambach, 5201 Byron, Chicago, Ill.
Filed Mar. 5, 1962, Ser. No. 177,297
3 Claims. (Cl. 152—204)

This invention relates in general to a vehicle tire and is more particularly described as a tire having a casing for either an inflated or a cushion tire filling of the type particularly used for automobiles. In this, the main or running portion of the casing is provided with armoring or protecting fillers which extend for the width of the tread or for a main portion of the tread and entirely around a tire with the ends so connected that they do not cause undue wear and abrasion which is detrimental not only to the casing, but also to the filler and to the mounting means for the filler.

In the present invention, a plurality of inner protecting elements extend entirely around the periphery of the filler close to the under side of the casing, usually of the same size for a tire of a certain size, in the form of metal hoops arranged closely together, and close to the inside of the tire, but the hoops being held in a spaced apart relation so that they will not engage each other nor become displaced and may easily be inserted and removed when the tire is taken down and before the tube or filler is inserted within the tire.

An important object of the invention is to provide an armored filler for a vehicle tire casing in which the separate elements extend around the tire inside of a casing and between it and an inflated tube or a build-up filler for the tire.

Another object of the invention is to provide means for holding the separate hoops or loops of the armoring element in substantially parallel relation and about the inner periphery of the casing.

A further object of the invention is to provide improved means for mounting an armored section within a tire casing so that the ends of the spacing means and also the ends of the armored hoops or loops are located in the tire without producing objectionable projections or depressions at their adjoining ends which would cause unbalancing of the tire or a wheel.

A still further object of the invention is to provide a plurality of armoring members with means for positioning them inside of a tire casing and substantially parallel to the outer tread so that they are held in place not only by the spacing means in which the hoops are mounted, but also by a cushioning means comprising upper and lower members having smooth junctures and further enclosing the armoring hoops and the spacing means within a tire.

Other objects of the invention will appear in the specification and will be apparent from the accompanying drawings in which, FIG. 1 is a perspective view of a mounted tire with a portion thereof cut away to show a plurality of metal armoring rings located at the inside of a casing and spaced apart and retained between an inflated inner tire and the outer casing.

FIG. 2 is a sectional view of the upper and tread portion of the tire as shown in FIG. 1.

FIG. 3 is a sectional view showing the method of connecting the ends of the metal ring packing means and avoiding objectionable projections and recesses therein.

FIG. 4 is a sectional view showing one method of connecting the adjacent ends of an armoring loop or hoop without forming objectionable projections and recesses;

FIG. 5 is another partial sectional view of the ends of a hoop in which they are cut off at an angle so that they may be taken apart and put together without objectional projections or depressions;

FIG. 6 is a partial sectional view showing overlapping beveled ends of one of the strips at their joint; and FIG. 7 is a partial sectional view showing a smooth fitting of the overlapping beveled ends of a spacer ring.

This armored tire has the advantage that it may be used either with a pneumatic inflated tube or with a flexible cushion filler, a great advantage being that the armory rings may be applied to new tires, and also to tires in use, and the filler, either air or cushion may be changed leaving the armoring in place. Although only a relatively few steel rings are shown in their special holder and spacer, a larger number of rings may be applied in the same manner, the rings may be larger or smaller, and they need not be exactly circular in cross section, and they may cover a larger proportion of the tread of a tire if desired.

Referring now more particularly to the drawings, a rubberized casing 10 may be mounted in a tire rim 12 in an ordinary way by engaging the beads at the edge of a casing with the upstanding edges of the rim and the casing preferably as in standard tread 14 preferably substantially straight as shown in FIG. 1 but also pulled down slightly at the sides in actual reuse as indicated in FIG. 2.

This casing may be distended by a sectional filler as shown in my prior Patent No. 2,634,779 and other similar forms of filler and also by an inflated inner tube 16. A filler or the tube 16 is applied to the tire in an ordinary and well known manner and this armoring construction is interposed between the outer rounded periphery of the tube and the corresponding inner periphery of the casing 10.

Extending around the tube 16 is a flexible plastic strip 18 preferably composed of a mixture of fiber and plastic having a relatively thick crown 20 and graduated thinner side edges 22 and of a width slightly larger than the compressed width of the tire. In the crown, is a recess 24 extending for the length of the strip and the ends 19 of the strip are preferably beveled so that they overlap, as indicated in FIG. 6 so that there can be some slight variation of the lengths of the strips and they will still fit compactly over a tube and within a casing.

An outer rubberized fabric strip 26 is shown in addition to the inner strip 18 which also has a groove 28 extending for the length of the strip and registering with the longitudinal recess 24 of the inner strip 18. This strip 26 is also preferably thicker at the crown with graduated side edges 30 so that it and the inner strip 18 may be inserted within a casing 10, reinforcing the casing and providing additional cushioning surface at the crown of the tire.

In the outer strip 26, one extremity may be formed with a projecting tongue 32, and the other extremity with a corresponding recess into which the tongue is inserted and fits closely so that there are no substantial openings to form depressions in the tire at the ends of the strip. The tongue 32 and the recess 34 may extend laterally for a considerable distance to unite the strip and to make a substantial bearing ring of it.

The groove 28 of the strip 26 which registers with the external or peripheral recess 24 of the strip 18 forms a channel for receiving a spacer 36 usually of rubber-like material or rubberized fabric or a similar flexible filler. This spacer fits closely within the said groove and recess, but not too closely and it is formed at the inner corners 38 with slight ribs or projections adapting it to fit more closely into the recess 34. The ends of the spacer 36 may be tongued and recessed as shown in FIG. 3 or ends 37 of a spacer 36a may be beveled to overlap and form a smooth joint as shown in FIG. 7, and as also suggested in FIG. 5 so that it will fit closely and smoothly within the groove 28 and recess 24.

In the spacer are a number of longitudinal circular grooves 40 each of a cross sectional diameter to closely receive an armoring ring 42 therein, each ring being exactly sized to fit in one of the grooves and extend circularly in the spacer or having oppositely beveled ends 44 as represented in FIG. 5 adapting the rings to be inserted in the openings 40. Leading to each groove in the spacer 36 is a reduced passageway 46 which may be sprung open because of the material of the spacer to admit an armoring ring 42 thereto, to hold it tightly in place and to prevent it from coming in contact with one of the other armoring rings. The passageway closes naturally due to the resilience of the material of the spacer 36 when the armoring ring and rings are seated in place therein.

Instead of having a beveled construction as shown in FIG. 5, the ends of a ring 48 may have reduced portions 50 inserted in a short connector or sleeve 52 which leaves no large openings at the ends of the sleeve or at the ends of the ring to form an objectionable projection in the tire.

With this construction, armoring rings may be inserted in a tire already in operation or in a new tire. Before the casing is distended and without a tube or filler, the fabric strip 26 is inserted within a casing 10, the ends connected by a tongue 32 and recess 34 construction, or by means of overlapping beveled ends. An armoring unit consisting of a spacer 36 may be seated in the groove 28 either before or after it is inserted in a casing, and a number of armoring rings may be inserted in corresponding grooves 40 by connecting graduated overlapping ends of the spacer, by inserting the solid rings into the proper passageways 46 and the grooves 40 thereof, or by inserting split rings with graduated or beveled ends 45 as shown in FIG. 5 through the passageway 46 into the grooves 40, and the spacer 36 will then be seated in the groove 28 at the inside of the strip 26. The rings may be inserted before the spacer is inserted in the groove 28 or afterwards, and since the armored rings fit tightly in the grooves 40, the passageways 46 thereto will be squeezed together and substantially closed since the spacer 36 is of rubber-like or other resilient material.

The fabric strip 18 may thereupon be applied to the spacer seated in the groove 28 and its projecting part of the spacer will overlap and fit into the recess 24 at the outside of the strip 18 retaining the armoring rings tightly in place, the thinner side edges 30 of the strip 26 and the corresponding thinner side edges 22 of the strip 18 curving downwardly into the side edges of the casing so that an inflated tube 16 or cushioning segments not shown may be fitted within the casing, the casing applied in an ordinary way to a rim 12 and the tube inflated in a well known manner.

To withdraw, replace or remove any of the rings, the tire must be taken down, the tube 16 and the inner strip 18 are removed, making the rings 42 accessible through their passageways 46, or the entire spacer 36 may be removed and armored rings 42 may be removed, replaced or inserted as desired.

A complete armoring insert for a tire may consist of an assembly of two strips as 18 and 26 with their joint openings for a spacer 36 and in which a plurality of armoring rings have been positioned through their respective passageways 46 which may be inserted in a tire. In actual practice, it is easier to insert the elements one at a time in the proper relation separately connecting the ends of the strips and the rings, if necessary, instead of attempting to assemble the insert and apply it as a unit to a tire.

In this way, the resilience of an inflated tire or one in use may be increased by the strips 18 and 26 inserted therein, but the protective or armoring effect will be greatly increased in the tire by the addition of the armoring rings 42. They may be increased transversely of a tire by widening the spacer and correspondingly widening the groove and recess in which it is positioned in a tire, the armoring rings may be increased or diminished in size, changing the grooves and passageways in accordance therewith.

While I have thus described a preferred construction in some detail, it should be regarded as an illustration or example rather than as a limitation or restriction of the invention, since various changes in the construction, combination, and arrangement of the parts may be made without departing from the spirit and scope of the invention.

I claim:

1. An armored vehicle tire, comprising a flexible outer casing, a rim to which it is attached at the inner edges thereof, a pair of flexible and resilient strips wider at the center and tapering at the sides applied within the tire, the strips together forming a continuous passageway between them, a spacer ring inserted in the passageway between the said pair of strips, the spacer ring inserted in said passageway having a plurality of parallel grooves, armoring rings fitting in the grooves and extending around the casing in spaced parallel relation, and resilient filler means within the casing to press the spacer ring and strips outwardly therein and to force the sides of the strips against the inner sides of the casing.

2. In an armoring element for a vehicle tire, a spacing ring having a plurality of parallel openings accessible from the inner side of the ring, a corresponding number of parallel metal rings inserted therein, a pair of strips thicker at the center and thinner at the side edges forming a central space for receiving the spacing ring with the parallel metal rings therein; the strips, spacing ring, and parallel metal rings all being formed with inserted and oppositely beveled ends to fit smoothly together within a vehicle tire casing.

3. An armored insert for a vehicle tire comprising a casing and a pair of strips wider at the center and narrow at the edges to fit together and within the vehicle tire casing, the two strips together forming a central longitudinal opening, an armored spacer ring fitting therein, means comprising beveled ends for smoothly connecting the ends of the strips and the spacer ring, each spacer ring having a plurality of parallel grooves with passageways extending therethrough to the inner side of the spacer ring, armored rings disposed within the grooves of the spacer ring through said passageways, the ends of the rings being oppositely beveled to fit closely within a tire and within the spacer ring parallel to the other rings therein.

References Cited in the file of this patent

UNITED STATES PATENTS 2,634,779    Lambach  --------------- Apr. 14, 1953

FOREIGN PATENTS 99,649    Switzerland  ------------ June 1, 1923